US012669330B2

(12) United States Patent
Kirsch

(10) Patent No.: US 12,669,330 B2
(45) Date of Patent: Jun. 30, 2026

(54) SYSTEMS AND METHODS FOR OBSTACLE ANALYSIS ASSOCIATED WITH A TRAVEL PATH OF A MACHINE

(71) Applicant: Caterpillar Inc., Peoria, IL (US)

(72) Inventor: Karl Kirsch, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 139 days.

(21) Appl. No.: 18/513,683

(22) Filed: Nov. 20, 2023

(65) Prior Publication Data

US 2025/0164248 A1 May 22, 2025

(51) Int. Cl.
G01C 21/00 (2006.01)
(52) U.S. Cl.
CPC ................................. G01C 21/005 (2013.01)
(58) Field of Classification Search
CPC .. G01C 1/00; G01C 3/20; G01S 17/86; G01S 7/4806; G01S 17/931; G01S 7/497; G01S 17/10; G08G 1/164; G08G 1/16; G05D 1/0214; G05D 1/0248; G02B 13/003
USPC ........................................................ 701/301
See application file for complete search history.

(56) References Cited

U.S. PATENT DOCUMENTS

| | | | | |
|---|---|---|---|---|
| 4,903,054 A | * | 2/1990 | Wible | .................. G05D 1/0238 |
| | | | | 250/239 |
| 10,878,288 B2 | | 12/2020 | Hieida et al. | |
| 11,560,690 B2 | | 1/2023 | Halder et al. | |
| 2014/0320293 A1 | * | 10/2014 | Hunter, Jr. | .............. G01L 19/12 |
| | | | | 340/626 |
| 2018/0284772 A1 | | 10/2018 | Ravichandran et al. | |
| 2020/0182969 A1 | * | 6/2020 | He | ........................ G01S 17/931 |
| 2020/0353916 A1 | * | 11/2020 | Schwartz | ............... B60Q 9/008 |
| 2021/0129750 A1 | * | 5/2021 | Nugent | ................... G01S 7/003 |
| 2022/0214427 A1 | | 7/2022 | Kim et al. | |

FOREIGN PATENT DOCUMENTS

| | | |
|---|---|---|
| CN | 109902857 B | 11/2020 |
| CN | 110569749 B | 11/2021 |
| CN | 114756030 A | 7/2022 |

* cited by examiner

*Primary Examiner* — Helal A Algahaim
*Assistant Examiner* — John D Holman

(57) ABSTRACT

Systems and methods may process spatial data associated with an object in a travel path of a machine. The systems and methods may determine an elevation of a surface of the travel path within an expected travel area of the machine. The systems and methods may determine a maximum height of the machine relative to the elevation of the surface. The systems and methods may identify spatial data points indicating elevations, associated with the object and relative to the elevation of the surface of the travel path, that satisfy an elevation threshold. The systems and methods may classify the object as a non-obstacle of the machine based on the spatial data points indicating the elevations satisfying the elevation threshold. The systems and methods may maintain the travel path of the machine based on the object being the non-obstacle of the machine.

20 Claims, 7 Drawing Sheets

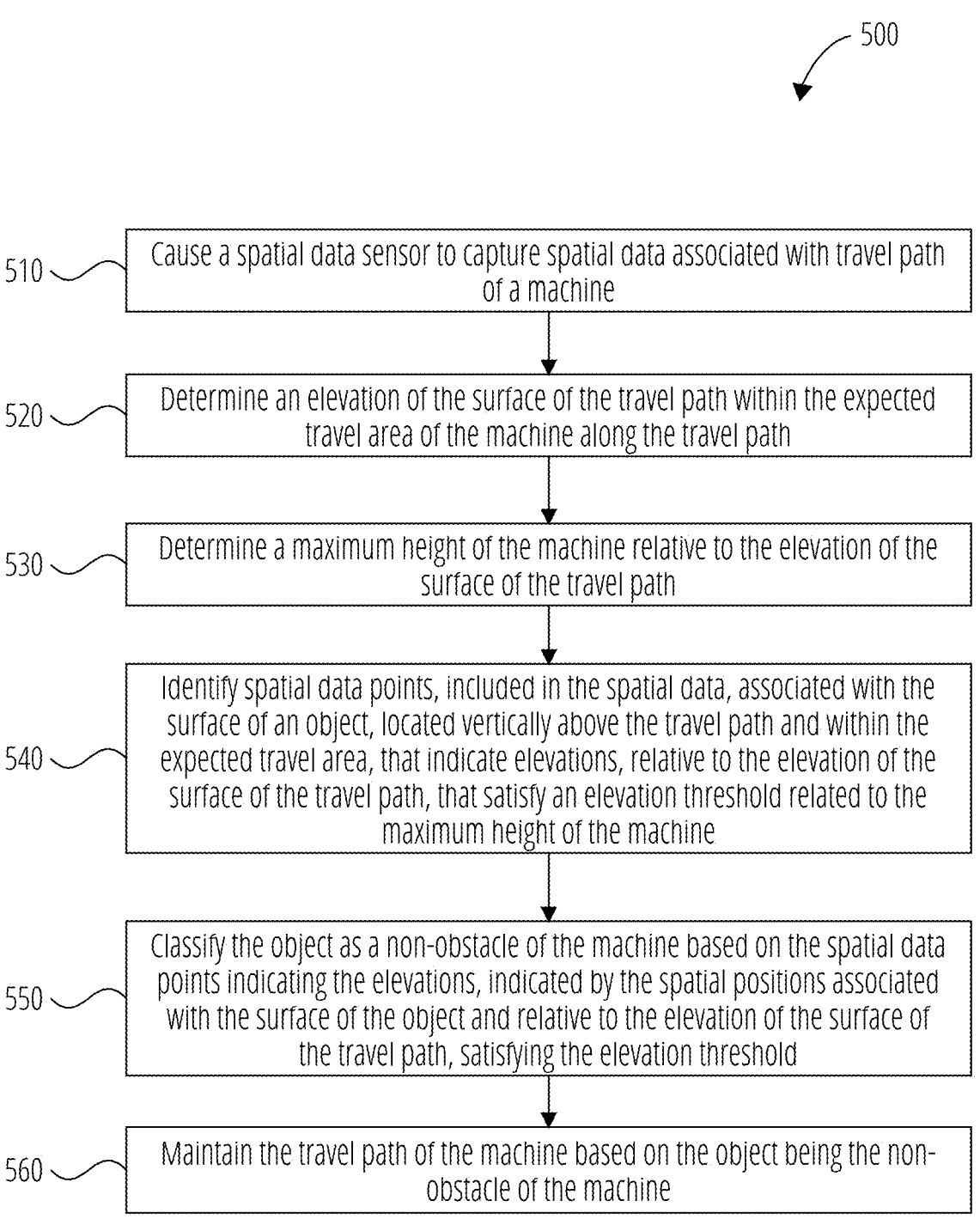

500

510 — Cause a spatial data sensor to capture spatial data associated with travel path of a machine 520 — Determine an elevation of the surface of the travel path within the expected travel area of the machine along the travel path 530 — Determine a maximum height of the machine relative to the elevation of the surface of the travel path 540 — Identify spatial data points, included in the spatial data, associated with the surface of an object, located vertically above the travel path and within the expected travel area, that indicate elevations, relative to the elevation of the surface of the travel path, that satisfy an elevation threshold related to the maximum height of the machine 550 — Classify the object as a non-obstacle of the machine based on the spatial data points indicating the elevations, indicated by the spatial positions associated with the surface of the object and relative to the elevation of the surface of the travel path, satisfying the elevation threshold 560 — Maintain the travel path of the machine based on the object being the non-obstacle of the machine

FIG. 5

SYSTEMS AND METHODS FOR OBSTACLE ANALYSIS ASSOCIATED WITH A TRAVEL PATH OF A MACHINE

TECHNICAL FIELD

The present disclosure relates generally to systems and methods for obstacle analysis associated with a travel path of a machine, and, more particularly, to systems and methods for obstacle analysis of a travel path of a machine based on spatial data related to the travel path of the machine.

BACKGROUND

Machines operating at a mine site, such as articulated dump trucks, can move throughout the mine site along a route. Often, the machines include obstacle detection systems for monitoring for obstacles as the machines travel along the route. In some cases, the mine sites include overhead objects (e.g., objects that are located vertically above the route). For example, suspended objects (e.g., wires, cables, overpasses, and/or bridges) are typically located vertically above and along the route of the machines. Although the suspended objects are not obstacles of the machines, in some cases, the obstacle detection systems incorrectly identify the suspended objects as obstacles of the machines.

For example, if the machines travel along the route toward an overpass at an incline, then the obstacle detection systems detect the overpass as an obstacle of the machine because the obstacle detection systems cannot accurately determine an elevation of the overpass, relative to the route, at a point that is beyond the incline (e.g., because a surface of the route is not within a scan area and/or a field of view of the sensor). Furthermore, because the overpass is a covered structure, the obstacle detection systems cannot receive localization data and/or positioning data (e.g., from a global positioning system (GPS)), and, as a result, the obstacle detection systems cause the machines to refrain from traveling under the overpass. This leads to unnecessary interruptions and/or delays associated with the machines operating at the mine site (e.g., because of incorrectly identifying overhead objects as obstacles of the machines).

U.S. Pat. No. 8,212,660 ("the '660 patent) describes a collision avoidance system for use with vehicles. More specifically, the '660 patent describes a collision avoidance system including a sensor, mounted to a vehicle at a reference height, for measuring a distance between an overhead obstacle ahead of the vehicle and a location of the sensor. The collision avoidance system determines a height of a tallest portion of the vehicle above ground level and adds the reference height to the distance between the obstacle and the sensor to determine a measured height of the obstacle. The collision avoidance system produces an alarm if the measured height of the obstacle is less than the height of the tallest portion of the vehicle. However, the '660 patent does not describe taking into account variable heights of the vehicle, variable loads associated with the vehicle and/or road conditions associated with a route of the vehicle when determining whether to produce an alarm associated with avoid a collision between the vehicle and the obstacle.

U.S. Patent App. Pub. No. 2004/0183661 ("the '661 publication") describes systems and methods for detecting the presence of and evaluating the approach to obstacles situated in the path of articles attached to the roof of a vehicle and alerting the driver of the vehicle when an impact or collision between the articles and the obstacles is likely to occur. The systems and methods described in the '661 publication use an ultrasonic transducer and circuitry to measure the distance to obstacles, an audible warning device, a microprocessor to control generation of ultrasonic pulses, to measure an echo delay, to calculate a risk of collision, and to signal the warning device. However, similar to the '660 patent, the '661 publication does not describe taking into account variable heights of the vehicle, variable loads associated with the vehicle and/or road conditions associated with a route of the vehicle when determining whether to produce an alarm associated with avoid a collision between the vehicle and the obstacle.

SUMMARY

According to an aspect of the present disclosure, obstacle analysis associated with a machine that travels along a travel path is described and/or may be implemented. The obstacle analysis system may comprise: a spatial data sensor operatively coupled to the machine; and a controller configured to: cause the spatial data sensor to capture spatial data associated with a scan area that is within a field of view of the spatial data sensor, wherein the scan area is associated with an expected travel area of the machine along the travel path, and wherein the spatial data includes spatial data points representing spatial positions associated with a surface of an object that is located vertically above the travel path and within the expected travel area and spatial positions associated with a surface of the travel path that is located within the expected travel area; determine an elevation of the surface of the travel path within the expected travel area; determine a maximum height of the machine relative to the elevation of the surface of the travel path; identify spatial data points, of the spatial data points associated with the surface of the object and within the expected travel area, indicating elevations, relative to the elevation of the surface of the travel path, that satisfy an elevation threshold related to the maximum height of the machine; classify the object as a non-obstacle of the machine based on the elevations, indicated by the spatial positions associated with the surface of the object and relative to the elevation of the surface of the travel path, satisfying the elevation threshold; and maintain the travel path of the machine based on the object being the non-obstacle of the machine.

According to another aspect of the present disclosure, a method is described and/or may be implemented. The method may comprise: causing, by a device, a spatial data sensor to capture spatial data associated with a scan area that is within a field of view of the spatial data sensor, wherein the scan area is associated with an expected travel area of the machine along the travel path, and wherein the spatial data includes spatial data points representing spatial positions associated with a surface of an object that is located vertically above the travel path and within the expected travel area and spatial positions associated with a surface of the travel path that is located within the expected travel area; determining, by the device, an elevation of the surface of the travel path within the expected travel area; determining, by the device, a maximum height of the machine relative to the elevation of the surface of the travel path; identifying, by the device, spatial data points, of the spatial data points associated with the surface of the object and within the expected travel area, indicating elevations, relative to the elevation of the surface of the travel path, that satisfy an elevation threshold related to the maximum height of the machine; classifying, by the device, the object as a non-obstacle of the machine based on the spatial data points indicating the elevations, indicated by the spatial positions associated with the surface of the object and relative to the elevation of the surface of the travel path, satisfying the elevation threshold; and maintaining, by the device, the travel path of the machine based on the object being the non-obstacle of the machine.

According to another aspect of the present disclosure, a non-transitory computer-readable storage medium having stored thereon instructions that, when executed by one or more processors, causes the one or more processors to perform a method is described, may be provided, and/or may be implemented. The method can comprise: causing a spatial data sensor to capture spatial data associated with a scan area that is within a field of view of the spatial data sensor, wherein the scan area is associated with an expected travel area of a machine that travels along a travel path, and wherein the spatial data includes spatial data points representing spatial positions associated with a surface of an object that is located vertically above the travel path and within the expected travel area and spatial positions associated with a surface of the travel path that is located within the expected travel area; determining an elevation of the surface of the travel path within the expected travel area; determining a maximum height of the machine relative to the elevation of the surface of the travel path; identifying spatial data points, of the spatial data points associated with the surface of the object and within the expected travel area, indicating elevations, relative to the elevation of the surface of the travel path, that satisfy an elevation threshold related to the maximum height of the machine; classifying the object as a non-obstacle of the machine based on the spatial data points indicating the elevations, indicated by the spatial positions associated with the surface of the object and relative to the elevation of the surface of the travel path, satisfying the elevation threshold; and maintaining the travel path of the machine based on the object being the non-obstacle.

BRIEF DESCRIPTION OF DRAWINGS

FIG. 5 is a flowchart of an example process associated with systems and methods for obstacle analysis of a travel path of a machine based on spatial data related to the travel path of the machine, in accordance with some embodiments of the present disclosure.

DETAILED DESCRIPTION

Figure 1:
FIG. 1 is a diagram of an example machine described herein, in accordance with some embodiments of the present disclosure.
Figure 1:
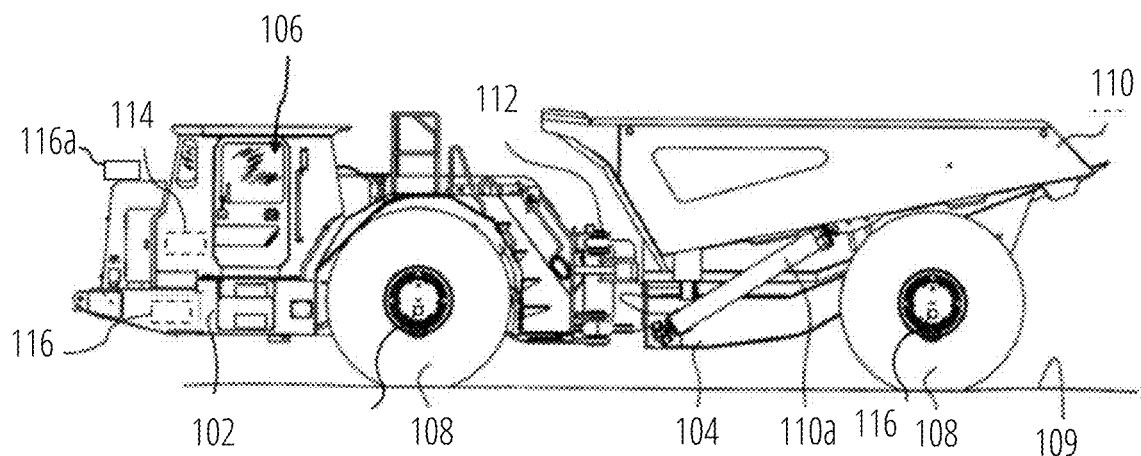

The present disclosure relates generally to systems and methods for obstacle analysis of a travel path of a machine based on spatial data related to the travel path of the machine. In some implementations, an obstacle analysis system may be included in a machine and may be used for obstacle analysis associated with a travel path of the machine. The obstacle analysis system may be communicably coupled to one or more sensors that are associated with and/or mounted to the machine. The obstacle analysis system may have universal applicability to any machine that performs obstacle analysis associated with obstacles along the travel path of the machine (e.g., obstacles that are located within the travel path of the machine, obstacles that are located along the travel path of the machine, and/or obstacles that are located within a surrounding environment of the machine). As used herein, the term "machine" may refer to any machine that performs an operation associated with an industry (e.g., a mining industry, a construction industry, a farming industry, and/or a transportation industry, among other examples).

Furthermore, the machine may be non-autonomous, autonomous, and/or a mix of both non-autonomous and autonomous. Autonomous may mean fully autonomous or semi-autonomous. As used herein, a "fully autonomous" machine may traverse a travel path and/or perform various tasks or operations (e.g., lifting, dumping, paving, compacting paving material, etc.) without operator control or input. As used herein, a "semi-autonomous" machine may traverse a travel path and/or perform various tasks or operations upon receiving input and/or approval from an operator.

In some implementations, the obstacle analysis system may receive data (e.g., spatial data) associated with the travel path of the machine. The obstacle analysis system may process the data to determine whether an object is positioned within the travel path at an elevation that satisfies an elevation threshold. In other words, the obstacle analysis system may process the data to detect objects that are located at positions that are vertically above a surface of the travel path (e.g., at a point along the travel path that is forward of the machine). If the obstacle analysis system detects an object at an elevation that satisfies the elevation threshold, then the obstacle analysis determines whether the object is connected to the surface of the travel path (e.g., via anchors when the object is a suspended object), as described in more detail elsewhere herein.

The obstacle analysis system may determine a position of the surface of the travel path associated with a position of the object (e.g., which may be located at a point that is forward of the machine along the travel path) using one or more localization and/or positioning techniques (e.g., based on localization and/or positioning data associated with the surface of the travel path). The obstacle analysis system may determine a clearance distance between the object and an elevation of the surface. The obstacle analysis system may determine (e.g., dynamically determine) an actual height of the machine (e.g., a maximum height of the machine), which may be based on a load that is carried by the machine and the elevation of the surface, to determine an actual clearance distance between the object and the actual height of the machine, as described in more detail elsewhere herein. In this way, the obstacle analysis system may classify and/or identify the object as an obstacle or a non-obstacle of the machine. As an example, the obstacle analysis system may classify and/or identify a suspended object as a non-obstacle of the machine based on determining that elevation of the object is greater than the actual height of the machine, as described in more detail elsewhere herein.

In some implementations, the obstacle analysis system may perform one or more actions based on the objecting being a non-obstacle of the machine. For example, the obstacle analysis system may maintain the travel path of the machine based on the objecting being a non-obstacle of the machine. As another example, the obstacle analysis system may provide an indication (e.g., to an operator via an operator interface) that the object is a non-obstacle of the machine. As another example, the obstacle analysis may exclude data associated with the object, based on the object being a non-obstacle of the machine, from being used (e.g., by the obstacle analysis system) for further obstacle analysis procedures.

FIG. 1 is a diagram of an example machine 100 described herein. As shown in FIG. 1, the machine 100 is embodied as an underground articulated truck (UAT), such as a UAT that may be employed at a worksite (e.g., a mine site), among other examples. Although the machine 100 in FIG. 1 is embodied as the UAT, the machine 100 may be any suitable machine (e.g., a wheel loader, a dump truck, a backhoe loader, and/or a skid-steer loader, among other examples) that is employable at any suitable worksite (e.g., a mine site, a construction site, a landfill, and/or a quarry, among other examples). As further shown in FIG. 1, the machine 100 includes a front frame 102, a rear frame 104, an operator station 106 (e.g., an operator cab), traction devices 108, and a dump body 110. The front frame 102 and the rear frame 104 are operatively connected (e.g., pivotably connected) to one another by an articulation joint 112.

As further shown in FIG. 1, the operator station 106 is supported by the front frame 102. In some implementations, the operator station 106 may include an operator interface that may be used to operate the machine 100 and/or one or more functions associated with the machine 100. For example, the operator interface may include one or more input devices (e.g., one or more buttons, keypads, touchscreens, trackballs, joy sticks, levers, pedals, and/or steering mechanisms, among other examples) and/or one or more output devices (e.g., one or more displays, illumination indicators, and/or speakers, among other examples). In some implementations, the operator station 106 and/or one or more components of the operator interface may be remotely located (e.g., not onboard the machine 100). In such a case, for example, the machine 100 may be remotely controlled and/or may remotely receive communications to perform one or more operations (e.g., in association with autonomous control of the machine 100), among other examples.

As further shown in FIG. 1, the traction devices 108 are rotatably supported by the front frame 102 and the rear frame 104 (e.g., a set of front wheels may be rotatably supported by the front frame 102 and a set of rear wheels may be rotatably supported by the rear frame 104). The traction devices 108 enable movement of the machine 100 over a surface 109 (e.g., a ground surface and/or a work surface associated with a worksite of the machine 100). Although the traction devices 108 are shown and described in connection with FIG. 1 as being wheels, the traction devices 108 may be any suitable traction devices, such as tracks and/or rollers, among other examples.

As further shown in FIG. 1, the dump body 110 is supported by the rear frame 104. In some implementations, the dump body 110 may include an actuator (e.g., shown as a hydraulic cylinder 110a in FIG. 1) to raise and/or lower the dump body. The dump body 110 may be configured to receive a load (or payload), such as ore, minerals, coal, rock, waste material, and/or backfill material, among other examples. The machine 100 may receive the load from a load location and may transport (e.g., along a travel path of the machine) the load to a dump location (e.g., to be released at the dump location).

In some implementations, the machine 100 may be associated with one or more weights (e.g., the machine 100 may be associated with a variable weight). As an example, the machine 100 may be associated with an operating weight (or operating mass) and a gross weight. The operating weight of the machine 100 may include a total weight of the machine 100 when the machine 100 is fully fueled, equipped with all standard attachments, is ready for operation, and is not carrying a load. In other words, the operating weight may be a no-load weight of the machine 100. As another example, the gross weight of the machine 100 may include the operating weight of the machine 100 and a weight of a load that is carried by the machine 100. Accordingly, for example, a maximum height of the machine 100 may vary based on the one or more weights (e.g., the maximum height of the machine 100 may be greater when the machine 100 operates at the operating weight than when the machine operates 100 at the gross weight).

As further shown in FIG. 1, the machine 100 includes an obstacle analysis system 114 and one or more sensors 116. In some implementations, the one or more sensors 116 may be associated with detecting spatial data related to the surrounding environment of the machine 100 and/or one or more parameters associated with the machine 100 (e.g., one or more operating parameters, load parameters, and/or maximum height parameters related to the machine 100, among other examples). As an example, the one or more sensors 116 may detect spatial data associated with a scan area of the travel path that is within a field of view (FOV) of the one or more sensors 116, as described in more detail elsewhere herein.

Accordingly, in some implementations, the one or more sensors 116 may include one or more spatial data sensors, LIDAR sensors (e.g., shown as a LIDAR sensor 116a in FIG. 1), cameras, image sensors, radio detection and ranging (RADAR) sensors, ultrasonic sensors, position sensors (e.g., one or more magnetometers, among other examples), location sensors (e.g., global navigation satellite system (GNSS) sensors, GPS sensors, local positioning system (LPS) sensors, inertial sensors (e.g., accelerometers and/or gyroscopes, among other examples), perception-based localization sensors, speed sensors, motion sensors, infrared sensors, temperature sensors, and/or pressure sensors, among other examples.

The one or more sensors 116 may send, and the obstacle analysis system 114 may receive, the spatial data. The obstacle analysis system 114 may process the spatial data (e.g., by performing one or more obstacle analysis techniques) to aid in classifying and/or identifying objects as obstacles of the machine or non-obstacles of the machine, among other examples), as described in more detail elsewhere herein.

As an example, the obstacle analysis system 114 may use the spatial data to generate a three-dimensional (3D) representation (e.g., a point cloud representation) associated with the scan area of the travel path that is within the FOV. The 3D representation may include spatial data points representing spatial locations (e.g., of surface points of an object and/or other features of the scene captured within the FOV). As an example, the spatial locations may correspond to x, y, and z coordinates (e.g., of a reference system associated with a spatial data sensor, among other examples), where the x coordinate represents a horizontal position of a point along an east-west direction in a reference frame (e.g., a surface or ground reference frame), where the y coordinate represents a horizontal position along a north-south direction in the reference frame, and where the z coordinate represents an elevation (e.g., a height) of a point above or below the reference frame). In other words, the z coordinate indicates a vertical position of the point relative to the surface (e.g., or ground).

The obstacle analysis system 114 may detect, classify, and/or identify (e.g., based on the 3D representation) one or more aspects associated with the surrounding environment and/or the machine 100 (e.g., one or more elevations, heights, shapes, contours, distances, and/or characteristics associated with the surrounding environment, objects within the surrounding environment, and/or the machine 100), as described in more detail elsewhere herein. Accordingly, for example, the obstacle analysis system 114 may be used to classify and/or identify an overhead object (e.g., a suspended structure which is supported by anchored cables, among other examples) that is positioned along the travel path of the machine 100 as an obstacle or a non-obstacle of the machine 100, as described in more detail elsewhere herein.

In some implementations, the spatial data may be light detection and ranging (LIDAR) data, and the obstacle analysis system 114 may generate a LIDAR point cloud. As an example, the obstacle analysis system 114 may cause a LIDAR sensor (e.g., the LIDAR sensor 116a) to emit rapid pulses of laser light and measure a time it takes for the light to reflect back to the LIDAR sensor (e.g., time-of-flight (TOF) measurements). The measurements, combined with an orientation and position of the LIDAR sensor, enables the obstacle analysis system 114 to create a 3D representation of the scanned area (e.g., the LIDAR point cloud representing the scanned area). The resulting LIDAR point cloud includes LIDAR data points, each including precise x, y, and z coordinates that collectively create a digital representation of the scanned area (e.g., including a digital representation of objects and/or the surrounding environment within the scanned area).

In some implementations, the obstacle analysis system 114 may detect spatial data points representing spatial positions associated with a surface of an object that is located vertically above the travel path and within the expected travel area and spatial positions associated with a surface of the travel path that is located within the expected travel area. The obstacle analysis system 114 may determine that the object is located at an elevated position relative to the surface at the expected travel area of the travel path of the machine 100, as described in more detail elsewhere herein.

As an example, the obstacle analysis system 114 may detect, based on the 3D representation, an object that is located at a position that is vertically above the surface 109 of the travel path (e.g., at a point along the travel path that is forward of the machine 100). As an example, the obstacle analysis system 114 may detect spatial data points corresponding to vertical positions of a surface of an object that are greater than an elevation of the surface 109.

In some implementations, the obstacle analysis system 114 may determine an elevation of the surface of the travel path within the expected travel area. As an example, the obstacle analysis system 114 may determine (and/or may estimate) the elevation of the surface 109 based on the spatial data received by the one or more sensors 116 and/or based on any other suitable data, such as historical data associated with the surrounding environment (e.g., stored by and/or received by the obstacle analysis system 114).

Accordingly, if the spatial data does not include data representing the surface (e.g., if the surface of the travel path is not within the FOV of the one or more sensors 116), then the obstacle analysis system 114 may determine and/or estimate the elevation of the surface 109 based on other data (e.g., data representing landmarks and/or waypoints associated with the surrounding environment, survey data indicating elevations associated with the surrounding environment, historical data associated with the surrounding environment, and/or data provided by other machines performing operations associated with a worksite of the machine 100, among other examples).

Based on detecting the object that is located at the position that is vertically above the surface 109 of the travel path, the obstacle analysis system 114 may determine (e.g., using one or more localization and/or positioning techniques) a position of the surface 109 along the travel path associated with a position (e.g., based on an x, y, and/or a z coordinate associated with the object), which may be located at a point that is forward of the machine 100 along the travel path).

In some implementations, the obstacle analysis system 114 may determine a clearance distance associated with the object (e.g., a distance between the object and the elevation of the surface 109) at the position of the surface 109 along the travel path. The obstacle analysis system 114 may determine (e.g., dynamically determine) an actual height of the machine 100 (e.g., a maximum height of the machine 100), relative to the elevation of the surface 109 at the position of the surface 109 along the travel path. The actual height of the machine 100 (e.g., the maximum height of the machine) may be variable (e.g., based on one or more machine height parameters), as described in more detail elsewhere herein.

In some implementations, the obstacle analysis system 114 may determine (and/or estimate) the actual height of the machine relative to the elevation of the surface 109 of the travel path. The obstacle analysis system 114 may determine (and/or estimate) the actual height of the machine based on one or more machine height parameters. As an example, the obstacle analysis system 114 may determine (and/or estimate) the actual height of the machine based on one or more weights associated with the machine 100, a machine type associated with the machine 100, a machine model, associated with the machine 100, sensor data provided by the one or more sensors 116, sensor data provided by other sensors, and/or grades of the surface at various locations along the travel path of the machine 100, among other examples. Accordingly, the actual height of the machine may vary based on the one or more machine height parameters, and the obstacle analysis system 114 may dynamically determine the actual height of the machine as the machine 100 travels over the surface 109 of the travel path, as described in more detail elsewhere herein.

In some implementations, the obstacle analysis system 114 may determine an actual clearance distance between the object and the actual height of the machine (e.g., the maximum height of the machine). As an example, the obstacle analysis system 114 may compare the vertical positions of the surface of the object and the actual height of the machine 100 to determine an actual clearance distance (e.g., a distance between a point (e.g., a lowest point) of the object and the actual height of the machine 100 (e.g., the maximum height of the machine 100).

In some implementations, the obstacle analysis system 114 may determine whether the object is a suspended object (e.g., an object that is suspended vertically above the travel path and while being anchored to the surface by one or more components). An object is a suspended object if the spatial data points corresponding to the vertical positions of the surface of the object are not connected to other spatial data points included in the 3D representation (e.g., at layers of z coordinates below the spatial data points corresponding to the vertical positions of the surface of the object).

In some implementations, the obstacle analysis system 114 may classify and/or identify the object as a non-obstacle of the machine 100 based on determining that the elevation associated with the object, relative to the elevation of the surface 109 of the travel path, is greater than the actual height of the machine 100, relative to the elevation of the surface 109 of the travel path at a location associated with the location of the object, as described in more detail elsewhere herein.

In some implementations, the obstacle analysis system 114 may identify spatial data points (e.g., spatial data points associated with surface points of an object that is located vertically above the travel path and within the expected travel area), indicating elevations, relative to the elevation of the surface 109 of the travel path, that satisfy an elevation threshold (e.g., a threshold elevation based on the maximum height of the machine, relative to the elevation of the surface 109 of the travel path at the expected travel area of the machine 100).

In some implementations, the obstacle analysis system 114 may detect and cluster the spatial data points. As an example, the obstacle analysis system 114 may detect and cluster spatial data points corresponding to vertical positions of the surface of the object that are greater than the actual height of the machine (e.g., the maximum height of the machine 100). Additionally, or alternatively, the obstacle analysis system 114 may create a histogram of the clustered spatial data points (e.g., which may represent spatial positions of the spatial data points) to efficiently determine whether the spatial data points corresponding to the vertical positions of the surface of the object are connected to other spatial data points.

In this way, the obstacle analysis system may process the spatial data to classify and/or identify an object as an obstacle or a non-obstacle of the machine 100. As an example, the obstacle analysis system may classify and/or identify a suspended object as a non-obstacle of the machine 100 based on determining that the vertical positions of the surface of the object are greater than the actual height of the machine 100 (e.g., based on clustering the spatial data points and/or based on the histogram created by the obstacle analysis system 114, among other examples), as described in more detail elsewhere herein. As a result, the obstacle analysis system 114 avoids incorrectly identifying the object as an obstacle, which prevents which prevents unnecessary interruptions and/or delays associated with the machine 100 operating at the mine site from occurring.

As indicated above, FIG. 1 is provided as an example. Other examples may differ from what was described in connection with FIG. 1

FIGS. 2A-2E are diagrams of an example 200 associated with an obstacle analysis system (e.g., included in a machine that travels along a travel path). As shown in FIGS. 2A-2E, example 200 includes an obstacle analysis system 201 (e.g., which may correspond to obstacle analysis system 114 of FIG. 1), a machine 202 (e.g., which may correspond to machine 100 of FIG. 1), a spatial data sensor 204 (e.g., which may correspond to the one or more sensors 116 and/or the LIDAR sensor 116a of FIG. 1), a scan area 206, an FOV 206a, spatial data points 206b, a surface 208 (e.g., which may correspond to surface 109 of FIG. 1), an object 210

Figure 2A:
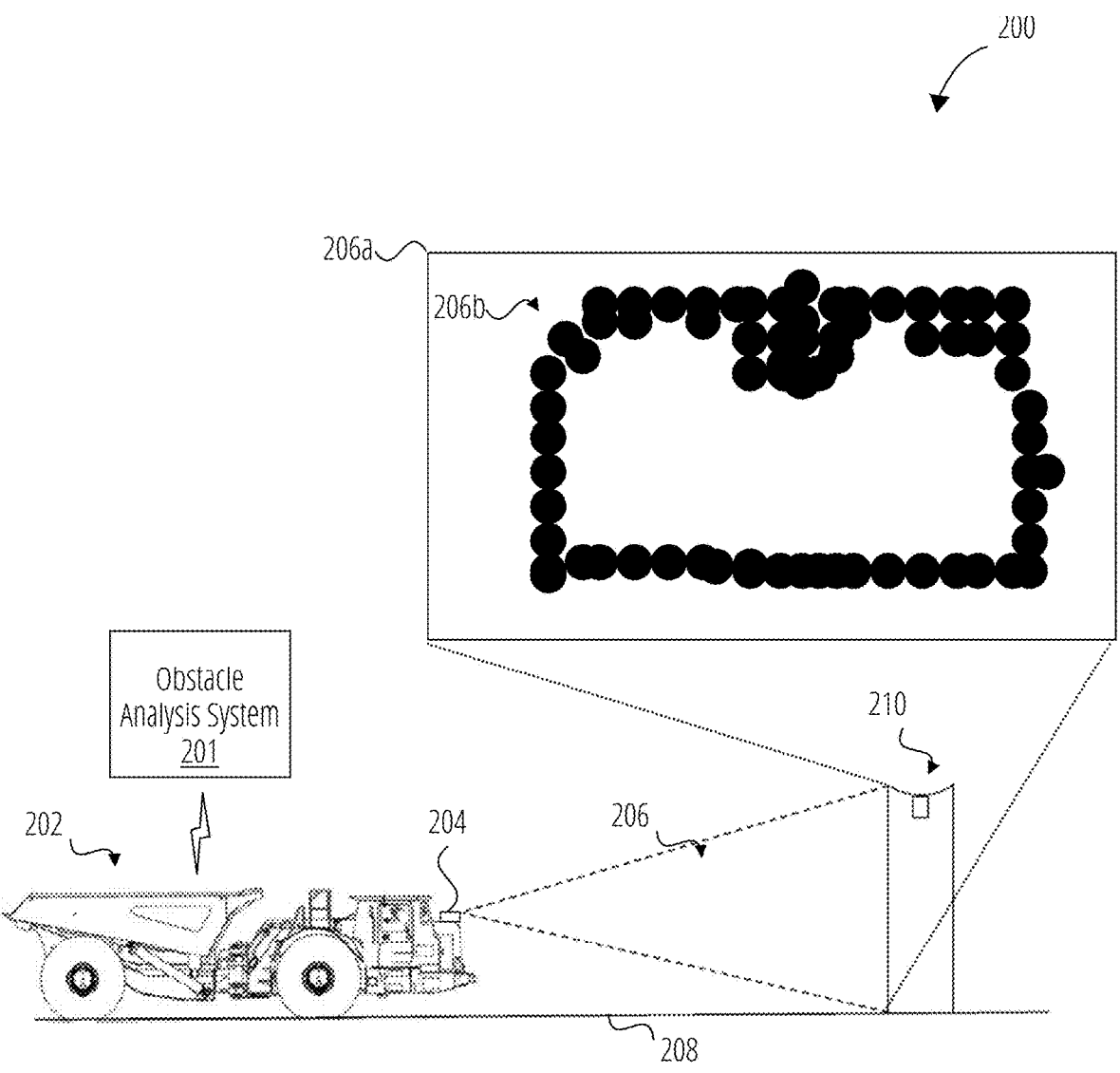
FIGS. 2A-2E are diagrams of an example associated with systems and methods for obstacle analysis of a travel path of a machine based on spatial data related to the travel path of the machine, in accordance with some embodiments of the present disclosure.
Figure 2B:
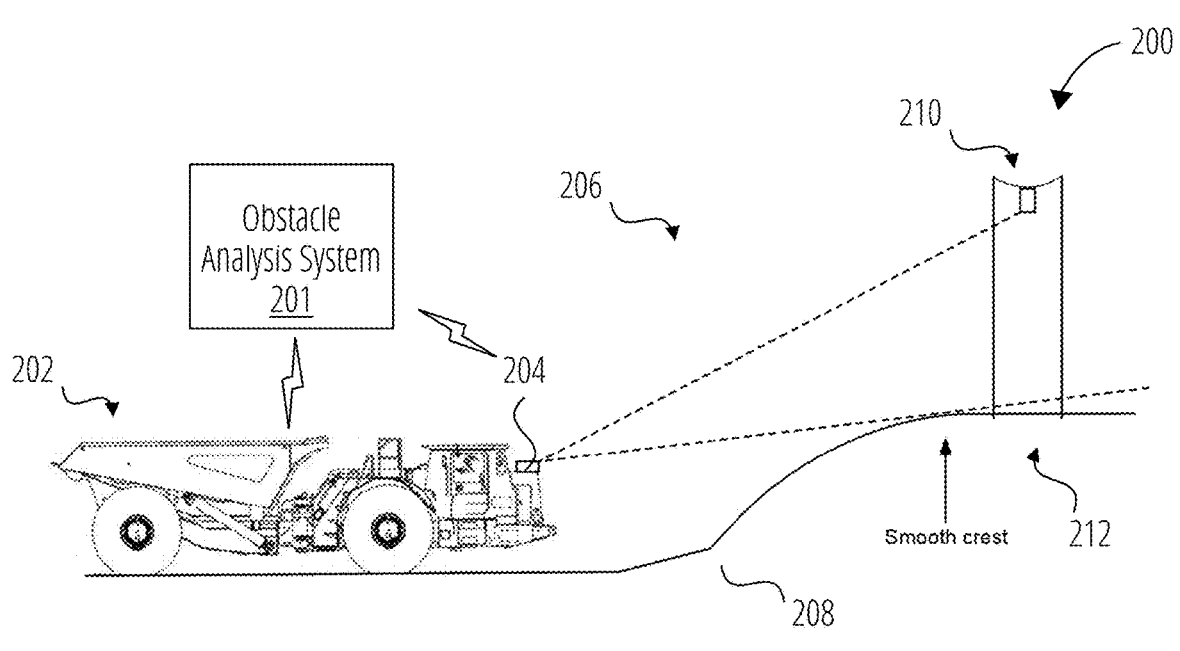
Figure 2C:
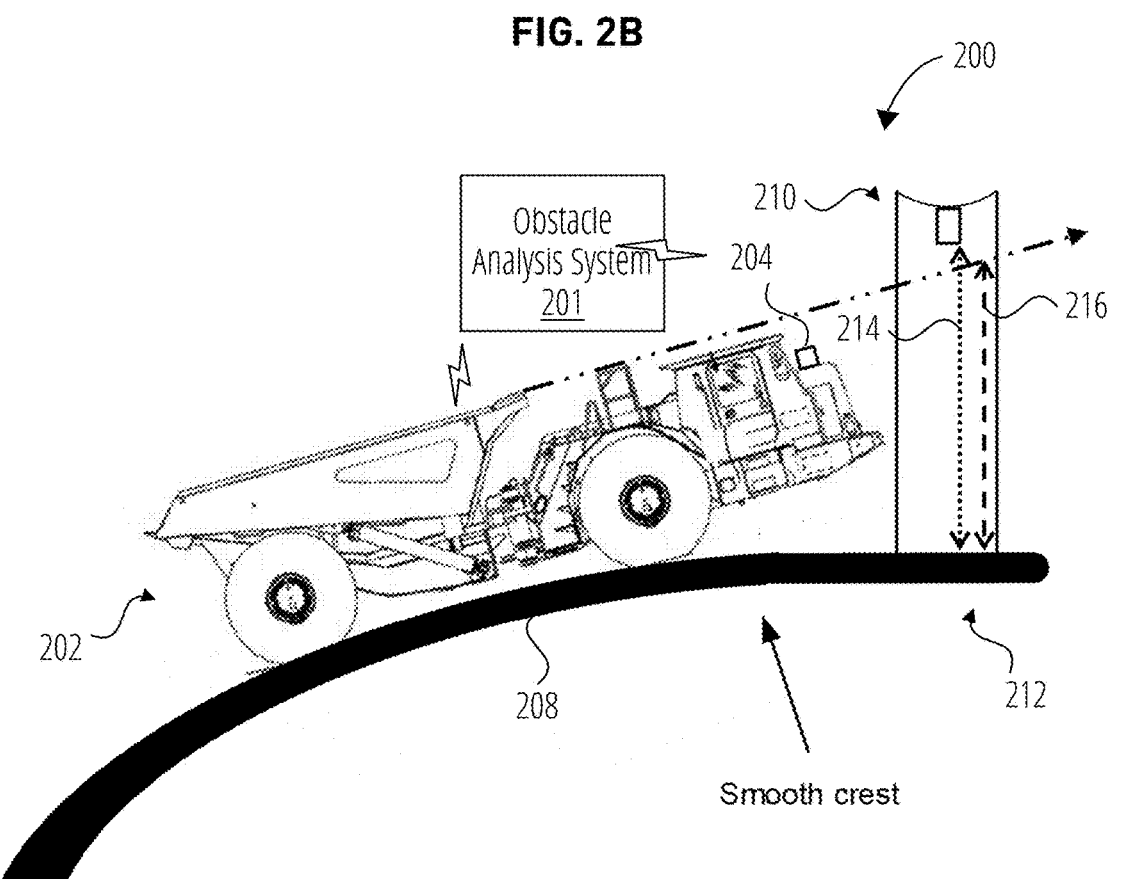
Figure 2D:
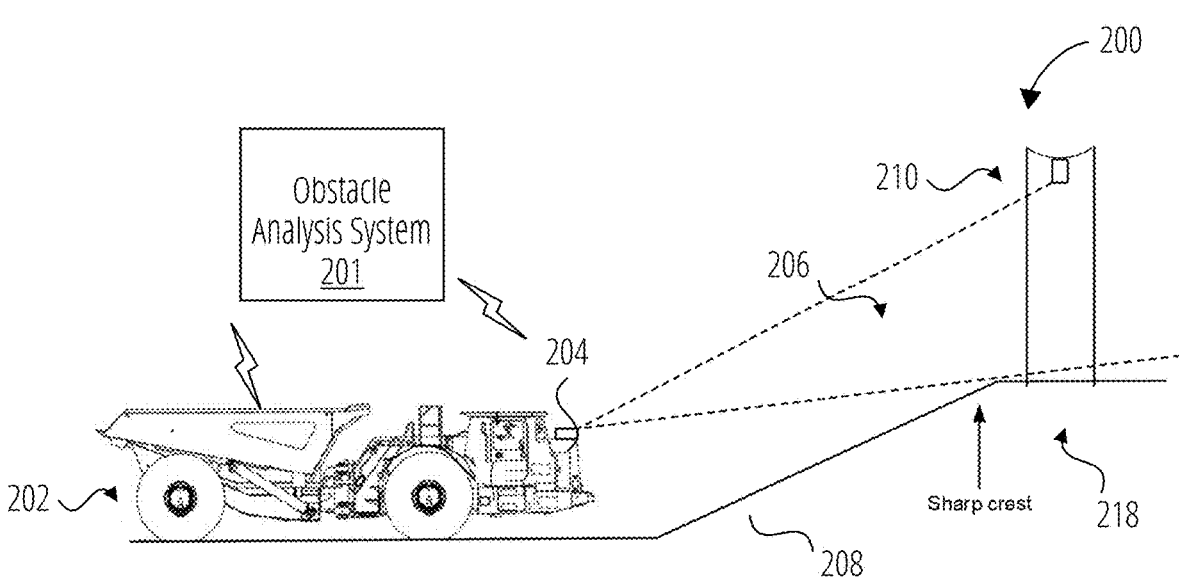
Figure 2E:
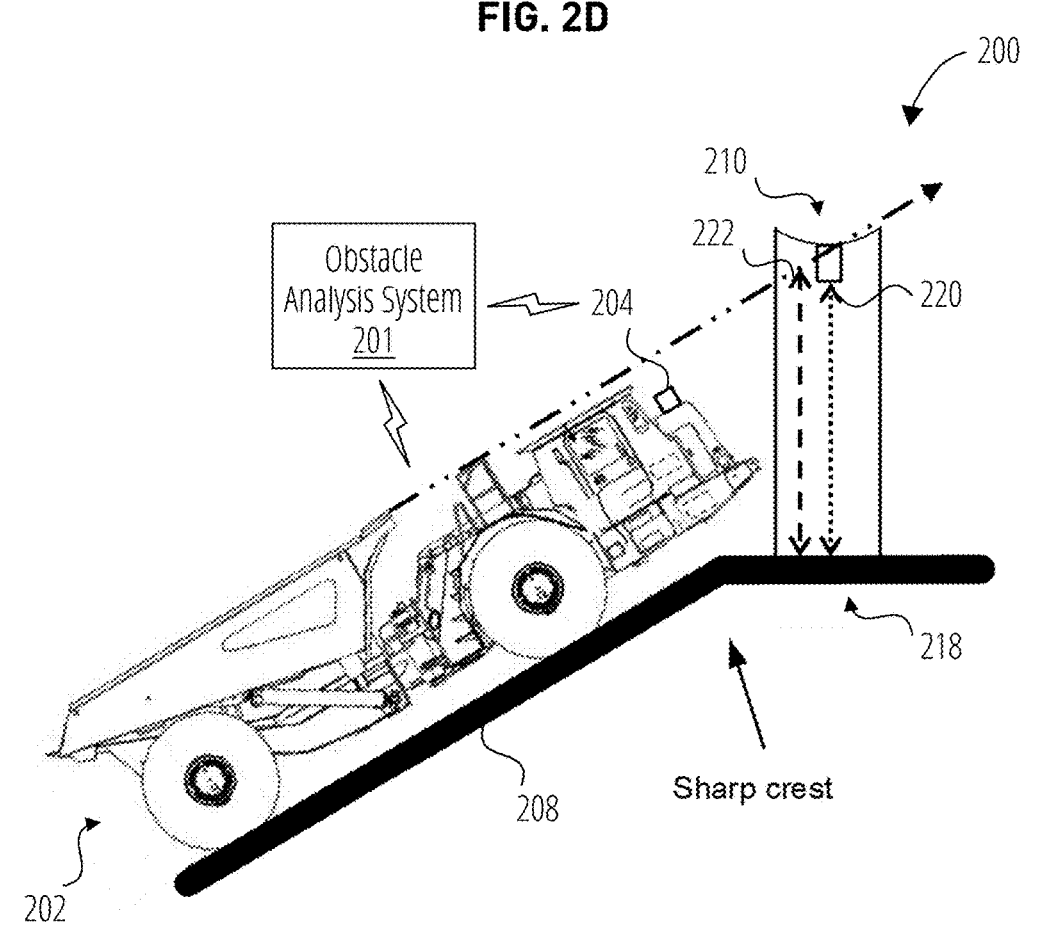

(e.g., shown as a suspended object that is located vertically above the travel path in FIGS. 2A-2E), a first expected travel area 212 (e.g., shown in FIG. 2C), a first object elevation 214 (e.g., shown in FIG. 2C), a first maximum height of the machine 216 (e.g., shown in FIG. 2C), a second expected travel area 218 (e.g., shown in FIG. 2E), a second object elevation 220 (e.g., shown in FIG. 2E), and a second maximum height of the machine 222 (e.g., shown in FIG. 2E).

As further shown in FIGS. 2A-2E, the spatial data sensor 204 is mounted to the machine 202 at a front end of the machine 202, which enables the scan area 206 (e.g., that is within the FOV 206a of the spatial data sensor 204) to be positioned forward of the machine 202 and facing the travel path (e.g., at an expected travel area of the machine 202). As further shown in FIGS. 2A-2E, the machine 202 and the spatial data sensor 204 are communicably coupled (e.g., via a network) to the obstacle analysis system 201. In this way, one or more components of the machine 202 and/or the spatial data sensor 204 may send, and the obstacle analysis system 201 may receive, data associated with the machine 202 (e.g., associated with one or more machine height parameters) and/or spatial data associated with the surrounding environment of the machine 202, among other examples.

As shown in FIG. 2A, the machine 202 travels over the surface 208 (e.g., along a travel path of the machine 100) toward the object 210. The obstacle analysis system 201 causes the spatial data sensor 204 to capture spatial data associated with the scan area 206 of the travel path (e.g., that is within the FOV 206a of the spatial data sensor 204). The scan area 206 is associated with an expected travel area of the machine 202.

As further shown in in FIG. 2A, the spatial data includes spatial data points 206b (e.g., in a spatial data point cloud within the FOV 206a created by the obstacle analysis system 202 using the spatial data provided by the spatial data sensor 204) which represent features of the surface 208 and the object 210. As an example, the spatial data points may represent spatial positions associated with the surface 208 of the travel path that is located within the expected travel area of the machine 202. The spatial positions may correspond to spatial coordinates (e.g., x, y, and z coordinates, among other examples) of surface points of the surface 208 and the object 210. In other words, the spatial data points may indicate distances of the surface points of the surface 208 and object 210 relative to the spatial data sensor 204, elevations of the surface points of the surface 208, and/or elevations associated with the object 210 relative to the elevation of the surface 208, as described in more detail elsewhere herein.

Accordingly, the obstacle analysis system 201 may process the spatial data to determine an elevation of the surface 208 of the travel path within the expected travel area. The obstacle analysis system 201 may determine an actual height of the machine (e.g., a maximum height of the machine) relative to the elevation of the surface 208 of the travel path. The obstacle analysis system 201 may identify spatial data points (e.g., representing the surface of points of the object 210) indicating elevations, relative to the elevation of the surface 208 of the travel path at the expected travel area of the machine 202, that satisfy an elevation threshold related to the maximum height of the machine 202. The obstacle analysis system 201 may classify the object 210 as a non-obstacle of the machine 202 based on the elevations satisfying the elevation threshold. The obstacle analysis system 201 may perform an action (e.g., maintain the travel path of the machine 202 and/or provide an indication that the object 210 is the non-obstacle, among other examples) or may refrain from performing an action (e.g., may refrain from using data associated with the object 210 and/or may refrain from altering the travel path of the machine 202) based on classifying the object as the non-obstacle of the machine 202.

As shown in FIGS. 2B-2C, the surface 208 includes a smooth crest near the first expected travel area 212 of the machine 202. The obstacle analysis system 201 may determine and/or estimate the first object elevation 214 (e.g., which corresponds to the object elevation of the object 210 relative to the elevation of the surface 208 at the first expected travel area 212) and may determine and/or estimate the first maximum height of the machine 216 (e.g., which corresponds to the maximum height of the machine relative to the elevation of the surface 208 at the first expected travel area 212). The obstacle analysis system 201 may compare the first object elevation 214 and the first maximum height 216 to determine whether to classify and/or identify the object 210 as an obstacle or a non-obstacle of the machine 202, as described in more detail elsewhere herein.

Because the first object elevation 214 is greater than the first maximum height of the machine 216, the obstacle analysis system 201 classifies the object 210 as a non-obstacle of the machine 201. In this way, although the object 210 is a suspended object that is located near an incline of the surface 208, the obstacle analysis system 201 can accurately classify and/or identify the object 210 as a non-obstacle of the machine 202 (e.g., based on dynamically determined elevations of the surface 208, elevations of the object 210, and maximum heights of the machine 202).

As shown in FIGS. 2D-2E, the surface 208 includes a sharp crest near the second expected travel area 218 of the machine 202. The obstacle analysis system 201 may determine and/or estimate the second object elevation 220 (e.g., which corresponds to the elevation of the object 210 relative to the elevation of the surface 208 at the second expected travel area 218) and may determine and/or estimate the second maximum height of the machine 222 (e.g., which corresponds to the maximum height of the machine 202 relative to the elevation of the surface 208 at the second expected travel area 218). The obstacle analysis system 201 may compare the second object elevation 220 and the second maximum height 222 to determine whether to classify and/or identify the object 210 as an obstacle or a non-obstacle of the machine 202. Because the second object elevation is less than the second maximum height of the machine 202, the obstacle analysis system 201 classifies and/or identifies the object 210 as an obstacle of the machine 202. In this way, although the object 210 is a suspended object that is located near an incline of the surface 208, the obstacle analysis system 201 can accurately classify the object 210 as an obstacle of the machine 202 (e.g., based on dynamically determined elevations of the surface 208, elevations of the object 210, and maximum heights of the machine 202).

Accordingly, the obstacle analysis system 201 may determine (and/or estimate) a clearance distance associated with the object 210 (e.g., a distance between the object 210 and the elevation of the surface 208 at the position of the surface 208 along the travel path (e.g., at the first expected travel area 212 and the second expected travel area 218). Additionally, the obstacle analysis system 201 may determine an actual clearance distance between the object 210 and the actual height of the machine 202 (e.g., at the first expected travel area 212 and the second expected travel area 218). The obstacle analysis system 201 may perform an action (e.g., maintain the travel path of the machine 202 and/or may provide an indication that the object 210 is the non-obstacle, among other examples) or may refrain from performing an action (e.g., may refrain from using data associated with the object 210 and/or may refrain from altering the travel path of the machine 202) based on classifying the object as the non-obstacle of the machine 202. In this way, the obstacle analysis system 201 avoids incorrectly identifying an object as an obstacle of the machine 202, which prevents which prevents unnecessary interruptions and/or delays associated with the machine 202.

As indicated above, FIGS. 2A-2E are provided as examples. Other examples may differ from what was described in connection with FIGS. 2A-2E.

Figure 3:
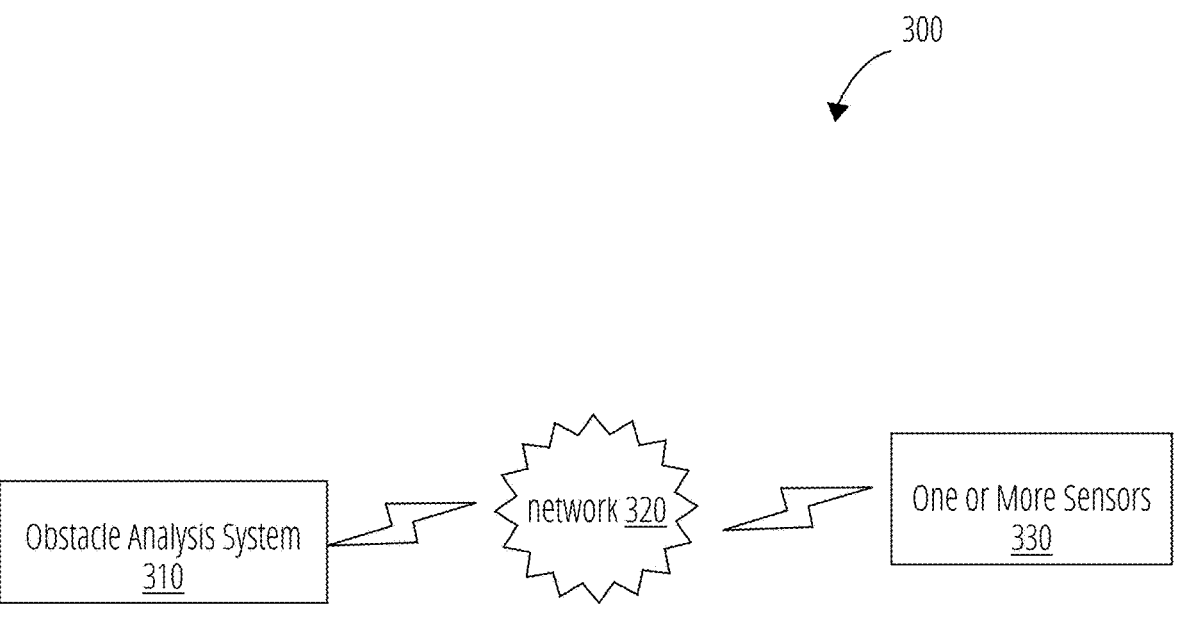
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 includes an obstacle analysis system 310 (e.g., which may correspond to the obstacle analysis system 114 and/or the obstacle analysis system 201), one or more sensors 320 (e.g., which may correspond to the one or more sensors 116, the LIDAR sensor 116a, and/or the spatial data sensor 204), and a network 330.

The obstacle analysis system 310 may include one or more devices capable of receiving, generating, storing, processing, providing, and/or routing information associated with obstacle analysis, as described elsewhere herein. The obstacle analysis system 310 may receive and/or process spatial data (e.g., LIDAR data, among other examples) to classify and/or identify an object as an obstacle or non-obstacle of the machine, as described in more detail elsewhere herein.

The one or more sensors 320 may include one or more spatial data sensors, LIDAR sensors (e.g., shown as a LIDAR sensor 116a in FIG. 1), cameras, image sensors, radio detection and ranging (RADAR) sensors, ultrasonic sensors, position sensors (e.g., one or more magnetometers, among other examples), location sensors (e.g., global navigation satellite system (GNSS) sensors, global positioning system (GPS) sensors, local positioning system (LPS) sensors, inertial sensors (e.g., accelerometers and/or gyroscopes, among other examples), perception-based localization sensors, speed sensors, motion sensors, infrared sensors, temperature sensors, and/or pressure sensors, among other examples.

The network 330 may include one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
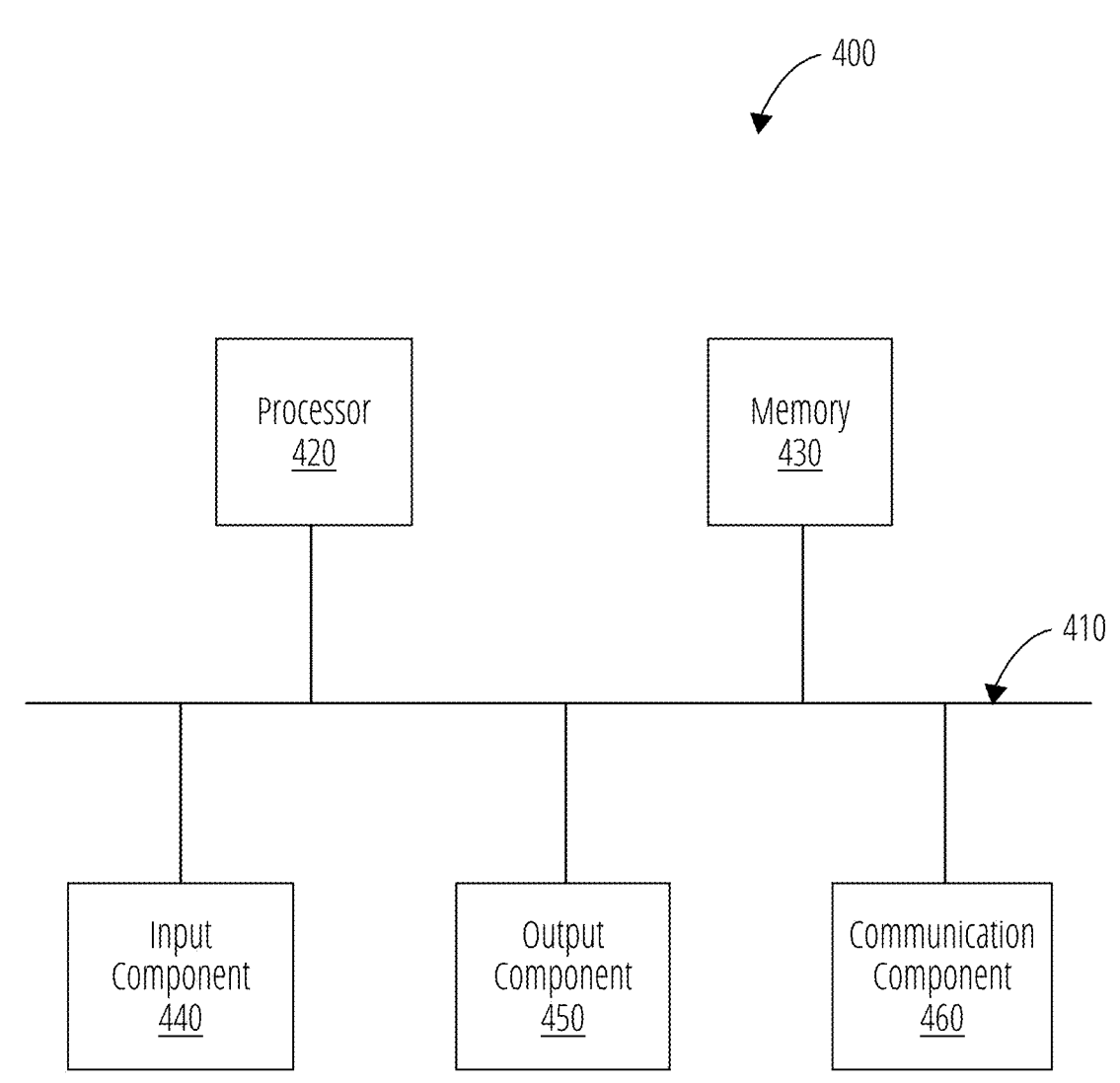
FIG. 4 is a diagram of example components of a device associated with systems and methods for obstacle analysis of a travel path of a machine based on spatial data related to the travel path of the machine, in accordance with some embodiments of the present disclosure.

FIG. 4 is a diagram of example components of a device 400 associated with obstacle analysis. The device 400 may correspond to the obstacle analysis system 114, the one or more sensors 116, the LIDAR sensor 116a, the obstacle analysis system 201, the spatial data sensor 204, the obstacle analysis system 310, and/or the one or more sensors 320. In some implementations, the obstacle analysis system 114, the one or more sensors 116, the LIDAR sensor 116a, the obstacle analysis system 201, the spatial data sensor 204, the obstacle analysis system 310, and/or the one or more sensors 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

INDUSTRIAL APPLICABILITY

As noted above, embodiments of the present disclosure relate to systems and methods for obstacle analysis of a travel path of a machine, and more particularly, to systems and methods for obstacle analysis of a travel path of a machine based on processing spatial data associated with the travel path.

In general, according to embodiments of the disclosed subject matter, the obstacle analysis system may receive data (e.g., spatial data) associated with the travel path of the machine. The obstacle analysis system may process the data to determine whether an object is positioned within the travel path at an elevation that satisfies an elevation threshold. The obstacle analysis system may determine a position of the surface of the travel path associated with a position of the object (e.g., which may be located at a point that is forward of the machine along the travel path) using one or more localization and/or positioning techniques (e.g., based on localization and/or positioning data associated with the surface of the travel path).

The obstacle analysis system may determine a clearance distance between the object and an elevation of the surface. The obstacle analysis system may determine (e.g., dynamically determine) an actual height of the machine (e.g., a maximum height of the machine), which may be based on a load that is carried by the machine and the elevation of the surface, to determine an actual clearance distance between the object and the actual height of the machine. In this way, the obstacle analysis system may classify and/or identify the object as an obstacle or a non-obstacle of the machine. As an example, the obstacle analysis system may classify and/or identify a suspended object as a non-obstacle of the machine based on determining that elevation of the object is greater than the actual height of the machine, as described in more detail elsewhere herein. As a result, the obstacle analysis system avoids incorrectly identifying an object as an obstacle of the machine, which prevents which prevents unnecessary interruptions and/or delays associated with the machine.

FIG. 5 is a flowchart of an example process 500 associated with obstacle analysis associated with a machine. In some implementations, one or more process blocks of FIG. 5 may be performed by an obstacle analysis system (e.g., the obstacle analysis system 114, the obstacle analysis system 201, and/or the obstacle analysis system 310). In some implementations, one or more process blocks of FIG. 5 may be performed by another device or a group of devices separate from or including the obstacle analysis system, such as one or more sensors (e.g., the one or more sensors 116, the LIDAR sensor 116*a*, and/or the spatial data sensor 204) among other examples. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include causing a spatial data sensor to capture spatial data associated with a travel path of a machine (block 510). For example, obstacle analysis system (e.g., using processor 420 and/or memory 430) may cause a spatial data sensor to capture spatial data associated with a travel path related to a scan area that is within an FOV of the spatial data sensor, as described above.

As further shown in FIG. 5, process 500 may include determining an elevation of the surface of the travel path within an expected travel area of the machine along the path (block 520). For example, the obstacle analysis system (e.g., using processor and/or memory 430) may determine an elevation of the surface of the travel path within an expected travel area of the machine along the path, as described above.

As further shown in FIG. 5, process 500 may include determining a maximum height of the machine relative to the elevation of the surface of the travel path (block 530). For example, the obstacle analysis system (e.g., using processor and/or memory 430) may determine a maximum height of the machine relative to the elevation of the surface of the travel path, as described above.

As further shown in FIG. 5, process 500 may include identifying spatial data points, included in the spatial data, associated with the surface of an object, located vertically above the travel path and within the expected travel area, that indicate elevations, relative to the elevation of the surface of the travel path, that satisfy an elevation threshold related to the maximum height of the machine (block 540). For example, the obstacle analysis system (e.g., using processor and/or memory 430), may identify spatial data points, included in the spatial data, associated with the surface of an object, located vertically above the travel path and within the expected travel area, that indicate elevations, relative to the elevation of the surface of the travel path, that satisfy an elevation threshold related to the maximum height of the machine, as described above.

As further shown in FIG. 5, process 500 may include classifying the object as a non-obstacle of the machine based on the spatial data points indicating the elevations, indicated by the spatial positions associated with the surface of the object and relative to the elevation of the surface of the travel path, satisfying the elevation threshold (block 550). For example, the obstacle analysis system (e.g., using processor and/or memory 430), may classify the object as a non-obstacle of the machine based on the spatial data points indicating the elevations, indicated by the spatial positions associated with the surface of the object and relative to the elevation of the surface of the travel path, satisfying the elevation threshold, as described above.

As further shown in FIG. 5, process 500 may include maintaining the travel path of the machine based on the object being the non-obstacle of the machine (block 560). For example, the obstacle analysis system (e.g., using processor and/or memory 430) may maintain the travel path of the machine based on the object being the non-obstacle, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1-FIG. 2E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

Embodiments of the disclosed subject matter can also be as set forth according to the following parentheticals.

(1) A system for obstacle analysis associated with a machine that travels along a travel path, comprising: a spatial data sensor operatively coupled to the machine; and a controller configured to: cause the spatial data sensor to capture spatial data associated with a scan area that is within a field of view of the spatial data sensor, wherein the scan area is associated with an expected travel area of the machine along the travel path, and wherein the spatial data includes spatial data points representing spatial positions associated with a surface of an object that is located vertically above the travel path and within the expected travel area and spatial positions associated with a surface of the travel path that is located within the expected travel area; determine an elevation of the surface of the travel path within the expected travel area; determine a maximum height of the machine relative to the elevation of the surface of the travel path; identify spatial data points, of the spatial data points associated with the surface of the object and within the expected travel area, indicating elevations, relative to the elevation of the surface of the travel path, that satisfy an elevation threshold related to the maximum height of the machine; classify the object as a non-obstacle of the machine based on the elevations, indicated by the spatial positions associated with the surface of the object and relative to the elevation of the surface of the travel path, satisfying the elevation threshold; and maintain the travel path of the machine based on the object being the non-obstacle of the machine.

(2) The obstacle analysis system according to (1), wherein the controller is configured to: cluster the spatial data to identify the elevations, indicated by the spatial positions associated with the surface of the object and relative to the elevation of the surface of the travel path, that satisfy the elevation threshold related to the maximum height of the machine.

(3) The obstacle analysis system according to any one of (1) to (2), wherein the elevation of the surface within the expected travel area is associated with a grade.

(4) The obstacle analysis system according to any one of (1) to (3), wherein the maximum height of the machine is based on a weight associated with the machine.

(5) The obstacle analysis system according to any one of (1) to (4), wherein the maximum height of the machine is estimated.

(6) The obstacle analysis system according to any one of (1) to (5), wherein the object is a suspended object.

(7) The obstacle analysis system according to any one of (1) to (6), wherein the spatial data sensor is at least one of: a light detection and ranging (LIDAR) sensor, an image sensor, or a radio detection and ranging (RADAR) sensor.

(8) A method for obstacle analysis associated with a machine that travels along a travel path, comprising: causing, by a device, a spatial data sensor to capture spatial data associated with a scan area that is within a field of view of the spatial data sensor, wherein the scan area is associated with an expected travel area of the machine along the travel path, and wherein the spatial data includes spatial data points representing spatial positions associated with a surface of an object that is located vertically above the travel path and within the expected travel area and spatial positions associated with a surface of the travel path that is located within the expected travel area; determining, by the device, an elevation of the surface of the travel path within the expected travel area; determining, by the device, a maximum height of the machine relative to the elevation of the surface of the travel path; identifying, by the device, spatial data points, of the spatial data points associated with the surface of the object and within the expected travel area, indicating elevations, relative to the elevation of the surface of the travel path, that satisfy an elevation threshold related to the maximum height of the machine; classifying, by the device, the object as a non-obstacle of the machine based on the spatial data points indicating the elevations, indicated by the spatial positions associated with the surface of the object and relative to the elevation of the surface of the travel path, satisfying the elevation threshold; and maintaining, by the device, the travel path of the machine based on the object being the non-obstacle of the machine.

(9) The method according to (8), further comprising: clustering the spatial data to identify the elevations, indicated by the spatial positions associated with the surface of the object and relative to the elevation of the surface of the travel path, that satisfy the elevation threshold related to the maximum height of the machine.

(10) The method according to any one of (8) to (9), wherein the elevation of the surface within the expected travel area is associated with a grade.

(11) The method according to any one of (8) to (10), wherein the maximum height of the machine is based on a weight associated with the machine.

(12) The method according to any one of (8) to (11), wherein the maximum height of the machine is estimated.

(13) The method according to any one of (8) to (12), wherein the object is a suspended object.

(14) The method according to any one of (8) to (13), wherein the spatial data sensor is at least one of: a light detection and ranging (LIDAR) sensor, an image sensor, or a radio detection and ranging (RADAR) sensor.

(15) A non-transitory computer-readable storage medium having stored thereon instructions that, when executed by one or more processors, causes the one or more processors to perform a method comprising: causing a spatial data sensor to capture spatial data associated with a scan area that is within a field of view of the spatial data sensor, wherein the scan area is associated with an expected travel area of a machine that travels along a travel path, and wherein the spatial data includes spatial data points representing spatial positions associated with a surface of an object that is located vertically above the travel path and within the expected travel area and spatial positions associated with a surface of the travel path that is located within the expected travel area; determining an elevation of the surface of the travel path within the expected travel area; determining a maximum height of the machine relative to the elevation of the surface of the travel path; identifying spatial data points, of the spatial data points associated with the surface of the object and within the expected travel area, indicating elevations, relative to the elevation of the surface of the travel path, that satisfy an elevation threshold related to the maximum height of the machine; classifying the object as a non-obstacle of the machine based on the spatial data points indicating the elevations, indicated by the spatial positions associated with the surface of the object and relative to the elevation of the surface of the travel path, satisfying the elevation threshold; and maintaining the travel path of the machine based on the object being the non-obstacle.

(16) The non-transitory computer-readable storage medium according to (15), wherein the method further comprises clustering the spatial data to identify the elevations, indicated by the spatial positions associated with the surface of the object and relative to the elevation of the surface of the travel path, that satisfy the elevation threshold related to the maximum height of the machine.

(17) The non-transitory computer-readable storage medium according to any one of (15) to (16), wherein the elevation of the surface within the expected travel area is associated with a grade.

(18) The non-transitory computer-readable storage medium according to any one of (15) to (17), wherein the maximum height of the machine is based on a weight associated with the machine.

(19) The non-transitory computer-readable storage medium according to any one of (15) to (18), wherein the maximum height of the machine is estimated.

(20) The non-transitory computer-readable storage medium according to any one of (15) to (19), wherein the spatial data sensor is at least one of: a light detection and ranging (LIDAR) sensor, an image sensor, or a radio detection and ranging (RADAR) sensor.

As used herein, satisfying a threshold may, depending on the context, refer to a value being greater than the threshold, greater than or equal to the threshold, less than the threshold, less than or equal to the threshold, equal to the threshold, and/or not equal to the threshold, among other examples.

As will be appreciated by one skilled in the art, aspects of the present disclosure may be embodied as a system, method, and/or or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B: A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A system for obstacle analysis associated with a machine that travels along a travel path, comprising:

one or more sensors operatively coupled to the machine, wherein the one or more sensors include a light detection and ranging (LIDAR) sensor; and a controller configured to, prior to the machine traversing through an expected travel area along the travel path cause the one or more sensors to capture spatial data associated with a scan area that is within a field of view of the one or more sensors, wherein the scan area associated with the captured spatial data that is within the field of view of the one or more sensors is associated with the expected travel area of the machine along the travel path, and wherein the captured spatial data includes:

spatial data points representing spatial positions associated with a surface of an object that is overhead of or that overhangs the travel path and within the expected travel area, and spatial positions associated with a surface of the travel path that is below the object and located within the expected travel area;

determine an elevation of the surface of the travel path that is below the object and within the expected travel area based on the captured spatial data captured by the one or more sensors;

determine a maximum height of the machine relative to the determined elevation of the surface of the travel path below the object and within the expected travel area, the determining of the maximum height of the machine including determining a current actual maximum height of the machine;

identify spatial data points, of the spatial data points associated with the surface of the overhead or overhanging object and within the expected travel area, that indicate elevations of the overhead or overhanging object, relative to the determined elevation of the surface of the travel path below the object and within the expected travel area, that satisfy an elevation threshold related to the determined maximum height of the machine;

classify the object as a non-obstacle of the machine for the machine to traverse along the surface of the travel path under the object and within the expected travel area based on the indicated elevations indicated as satisfying the elevation threshold related to the determined maximum height of the machine; and maintain the travel path of the machine based on the object being the non-obstacle of the machine, where the maintained travel path includes the machine traveling under the object within the expected travel area, wherein the maintaining the travel path is performed after the object has been determined to be the non-obstacle and includes performing obstacle detection excluding the spatial data points corresponding to the object as the non-obstacle, and wherein the spatial data points are identified for exclusion from the obstacle detection based on clustering and suspension.

2. The system according to claim 1, wherein the controller is configured to:

in order to identify the elevations that satisfy the elevation threshold related to the determined maximum height of the machine, cluster the spatial data that are indicated by the spatial positions associated with the surface of the object and relative to the elevation of the surface of the travel path under the object and within the expected travel area to satisfy the elevation threshold related to the determined maximum height of the machine and that are not connected to spatial data failing to satisfy the elevation threshold.

3. The system according to claim 1, wherein the elevation of the surface below the object and within the expected travel area is associated with a non-zero inclined grade, wherein the surface below the object is at a first elevation, and wherein a current surface of the machine is at a second elevation less than the first elevation of the surface such that the current surface of the machine is connected to the surface below the object via the non-zero inclined grade.

4. The system according to claim 1, wherein the determined maximum height of the machine is based on a weight associated with the machine.

5. The system according to claim 1, wherein the determined maximum height of the machine is estimated.

6. The system according to claim 1, wherein the one or more sensors further include an image sensor.

7. The system according to claim 1, wherein the current actual maximum height of the machine is determined with the machine inclined at an incline toward the surface that is below the object and within the expected travel area.

8. The system according to claim 1, wherein the current actual maximum height of the machine is determined based on a real-time determination of a weight of the machine.

9. A method for obstacle analysis associated with a machine that travels along a travel path to reduce false-positive obstacle identification for overhead or overhanging objects along the travel path, comprising:

causing, by a processing circuitry, one or more sensors to capture spatial data associated with a scan area that is within a field of view of the one or more sensors, wherein the scan area associated with the captured spatial data that is within the field of view of the one or more sensors is associated with an expected travel area of the machine along the travel path, and wherein the spatial data includes:

spatial data points representing spatial positions associated with a surface of an object that is overhead of or that overhangs the travel path and within the expected travel area, and spatial positions associated with a surface of the travel path that is below the object and located within the expected travel area;

determining, by the processing circuitry, an elevation of the surface of the travel path that is below the object and within the expected travel area based on the captured spatial data captured by the one or more sensors;

determining, by the processing circuitry, a maximum height of the machine relative to the determined elevation of the surface of the travel path below the object and within the expected travel area, the determining of the maximum height of the machine including determining a current actual maximum height of the machine;

identifying, by the processing circuitry, spatial data points, of the spatial data points associated with the surface of the overhead or overhanging object and within the expected travel area, that indicate elevations of the overhead or overhanging object, relative to the determined elevation of the surface of the travel path below the object and within the expected travel area, which satisfy an elevation threshold related to the determined maximum height of the machine;

classifying, by the processing circuitry, the object as a non-obstacle of the machine for the machine to traverse along the surface of the travel path under the object and within the expected travel area based on the spatial data points indicating the elevations which satisfy the elevation threshold related to the determined maximum height of the machine; and maintaining, by the processing circuitry, movement of the machine toward the expected travel area along the travel path of the machine based on the object being the non-obstacle of the machine, wherein said maintaining of the movement of the machine toward the expected travel area along the surface of the travel path is performed after the object has been determined to be the non-obstacle and includes performing obstacle detection excluding the spatial data points corresponding to the object as the non-obstacle, and wherein the spatial data points are excluded from the obstacle detection based on clustering and suspension.

10. The method of claim 9, wherein in order to identify the elevations satisfying the elevation threshold related to the determined maximum height of the machine, clustering the spatial data that are indicated by the spatial positions associated with the surface of the object and relative to the elevation of the surface of the travel path under the object and within the expected travel area to satisfy the elevation threshold related to the determined maximum height of the machine and that are not connected to spatial data that fails to satisfy the elevation threshold.

11. The method of claim 9, wherein the elevation of the surface below the object and within the expected travel area is associated with a non-zero inclined grade, and wherein the machine is inclined toward the surface below the object at the non-zero inclined grade for said determining the maximum height of the machine.

12. The method of claim 9, wherein the determined maximum height of the machine is based on a weight associated with the machine.

13. The method of claim 9, wherein the determined maximum height of the machine is estimated.

14. The method of claim 9, wherein the one or more sensors is at least one of:

a light detection and ranging (LIDAR) sensor, an image sensor, or a radio detection and ranging (RADAR) sensor.

15. A non-transitory computer-readable storage medium having stored thereon instructions that, when executed by one or more processors, causes the one or more processors to perform a method comprising:

causing one or more sensors to capture spatial data associated with a scan area that is within a field of view of the one or more sensors, wherein the scan area associated with the captured spatial data that is within the field of view of the one or more sensors is associated with an expected travel area of a machine that travels along a travel path, and wherein the spatial data includes:

spatial data points representing spatial positions associated with a surface of an object that is overhead of or that overhangs the travel path and within the expected travel area, and spatial positions associated with a surface of the travel path that is below the object and located within the expected travel area based on the captured spatial data captured by the one or more sensors;

determining an elevation of the surface of the travel path that is below the object and within the expected travel area based on the captured spatial data captured by the one or more sensors;

determining a maximum height of the machine relative to the determined elevation of the surface of the travel path below the object and within the expected travel area, said determining of the maximum height of the machine including determining a current actual maximum height of the machine;

identifying spatial data points, of the spatial data points associated with the surface of the overhead or overhanging object and within the expected travel area, that indicate elevations of the overhead or overhanging object, relative to the determined elevation of the surface of the travel path below the object and within the expected travel area, which satisfy an elevation threshold related to the determined maximum height of the machine;

classifying the object as a non-obstacle of the machine for the machine to traverse along the surface of the travel path under the object and within the expected travel area based on the spatial data points indicating the elevations which satisfy the elevation threshold; and maintaining the travel path of the machine based on the object being the non-obstacle, wherein said maintaining the travel path is performed after the object has been determined to be the non-obstacle and includes performing obstacle detection excluding the spatial data points corresponding to the object as the non-obstacle, and wherein the spatial data points are identified for exclusion from the obstacle detection based on clustering and suspension.

16. The non-transitory computer-readable storage medium according to claim 15, wherein in order to identify the elevations, satisfying the elevation threshold related to the determined maximum height of the machine, clustering indicated by the spatial positions associated with the surface of the object and relative to the elevation of the surface of the travel path, that are above the elevation threshold related to the maximum height of the machine.

17. The non-transitory/computer-readable storage medium according to claim 15, wherein the elevation of the surface below the object and within the expected travel area is associated with a non-zero inclined grade, and wherein the machine is inclined toward the surface below the object at the non-zero inclined grade for said determining the maximum height of the machine.

18. The non-transitory computer-readable storage medium according to claim 15, wherein the determined maximum height of the machine is based on a weight associated with the machine.

19. The non-transitory/computer-readable storage medium according to claim 15, wherein the determined maximum height of the machine is estimated.

20. The non-transitory computer-readable storage medium according to claim 15, wherein the one or more sensors includes:

a light detection and ranging (LIDAR) sensor and an image sensor.

\*  \*  \*  \*  \*